(12) United States Patent
Esimai

(10) Patent No.: US 7,322,063 B2
(45) Date of Patent: Jan. 29, 2008

(54) COMBINATION NOTEBOOK COMPUTER SUPPORT AND CUSHION

(76) Inventor: Ifeanyi Esimai, 180 Sunset Dr., Hempstead, NY (US) 11550

(*) Notice: Subject to any disclaimer, the term of this patent is extended or adjusted under 35 U.S.C. 154(b) by 37 days.

(21) Appl. No.: 11/321,225

(22) Filed: Dec. 29, 2005

(65) Prior Publication Data

US 2006/0138297 A1 Jun. 29, 2006

Related U.S. Application Data

(60) Provisional application No. 60/639,882, filed on Dec. 29, 2004.

(51) Int. Cl.
*A47C 16/00* (2006.01)
(52) U.S. Cl. ............... 5/652.1; 5/653; 108/43
(58) Field of Classification Search ............... 5/652, 5/653, 654, 652.2, 925, 652.1; 108/43; 248/633
See application file for complete search history.

(56) References Cited

U.S. PATENT DOCUMENTS

| | | | |
|---|---|---|---|
| 3,652,051 A | 3/1972 | McFarlane | |
| 4,923,247 A * | 5/1990 | Malmstrom | 297/4 |
| 5,081,936 A * | 1/1992 | Drieling | 108/43 |
| 5,143,341 A * | 9/1992 | Juster | 248/444 |
| D374,357 S | 10/1996 | McCray et al. | |
| D377,130 S | 1/1997 | Dorrer | |
| 5,611,098 A | 3/1997 | Skibik | |
| 6,305,652 B1 | 10/2001 | Borke et al. | |
| 6,374,751 B1 * | 4/2002 | With | 108/43 |
| 6,894,894 B2 * | 5/2005 | Zarek et al. | 361/683 |
| 6,957,612 B2 * | 10/2005 | Conlee | 108/43 |

* cited by examiner

*Primary Examiner*—Michael Trettel
(74) *Attorney, Agent, or Firm*—James Ray & Assoc.

(57) ABSTRACT

A cushioning and support device includes a unitary member having a predetermined size, a pair of cavities formed in a first surface of such unitary member for ergonomic engagement with at least one portion of a human body and a plurality of longitudinal grooves formed in an opposed second surface of such unitary member in a direction perpendicular to a direction of the pair of cavities for providing air ventilation under a load placed onto the second surface.

14 Claims, 1 Drawing Sheet

US 7,322,063 B2

COMBINATION NOTEBOOK COMPUTER SUPPORT AND CUSHION

CROSS-REFERENCE TO RELATED APPLICATIONS

This application is related to and claims priory from Provisional Patent Application Ser. No. 60/639,882 filed Dec. 29, 2004.

FIELD OF THE INVENTION

The present invention relates, in general, to computers and computer supports and, more particularly, this invention relates to a combined notebook computer support and general use cushion.

BACKGROUND OF THE INVENTION

As is generally well known, the use of portable electronic devices such as notebook computers, DVD players and the like, aided by proliferation of the wireless internet access, is now widespread in a variety of different environments, such as airplanes, airports, parks, libraries and the like. Such environments are characterized by a physical constraint wherein a rigid flat surface is not readily available or convenient for use with such electronic devices.

As a result, such electronic devices are often placed onto the user's lap. One disadvantage of such placement is that electronic devices, in particular notebook computers, dissipate heat out through the bottom surface and directly into the user's lap causing discomfort during use. Another disadvantage is associated with the tendency of the electronic device to slide or shift requiring the user to tense leg muscles in order to balance the computer which causes an additional discomfort during extended use. Yet another disadvantage is related to a physical environment, such as a park or a crowded airport, where the user may not have a comfortable surface to sit on while using the computer or while simply enjoying an outdoor environment or waiting at the crowded airport.

Therefore, there is a need for a portable device for conveniently and comfortably supporting an electronic device on the lap of the user and which may be used as a sitting cushion.

It is also generally known that a person kneeling on a hard surface for an extended period of time experiences discomfort in the knee portion of the body. The available kneeling cushion devices of a type that are used extensively in gardening, while providing cushioned knee support, fail to provide overall comfortable support during extended kneeling.

Therefore, there is a need for a single portable device capable of conveniently and comfortably supporting an electronic device on the lap of the user and which may be comfortably used as a cushion during kneeling or sitting.

SUMMARY OF THE INVENTION

The invention provides a combination cushioning and support device which includes a unitary member having a predetermined size. A pair of cavities are formed in a first surface of such unitary member for ergonomic engagement with at least one portion of a human body. Predetermined pluralities of longitudinal grooves are formed in an opposed second surface of such unitary member in a direction perpendicular to a direction of the pair of cavities for providing air ventilation under a load placed onto the second surface.

OBJECTS OF THE INVENTION

It is, therefore, one of the primary objects of the present invention to provide a combination notebook computer and cushioning device.

Another object of the present invention is to provide a combination notebook computer and cushioning device that has anti-slip properties.

Yet another object of the present invention is to provide a combination notebook computer and cushioning device which dissipates heat generated by such computer away from the user's body.

A further object of the present invention is to provide a combination notebook computer and cushioning device which provides comfortable cushioning for a person who is kneeling or sitting.

Yet a further object of the present invention is to provide a combination notebook computer and cushioning device which is simple to manufacture.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
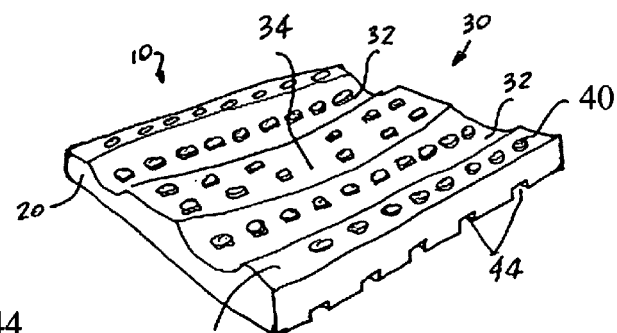
FIG. 1 is a perspective view of the cushioning and support device of the presently preferred embodiment of the invention, particularly illustrating the structure of a first surface.

Prior to proceeding to the more detailed description of the present invention, it should be noted that, for the sake of clarity and understanding, identical components which have identical functions have been identified with identical reference numerals throughout the several views illustrated in the drawing figures.

Reference is now made, to FIGS. 1-5, wherein there is shown a cushioning and support device, generally designated 10, of the present invention which includes a unitary member 20 having each of a predetermined size and predetermined material, a first surface 22 and an opposed second surface 24. In the presently preferred embodiment, such predetermined material of the unitary member 20 is flexible foam and, more particularly, HR-PU foam that has inherent shape memory and anti-slip properties. It is further preferred that such device 10 is manufactured by a molding process.

Figure 3:
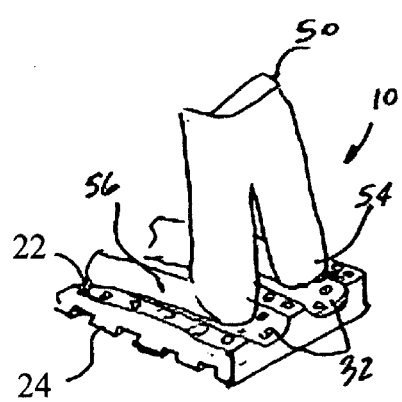
FIG. 3 is a partial perspective view of the present invention in use with a person kneeling thereon.
Figure 4:
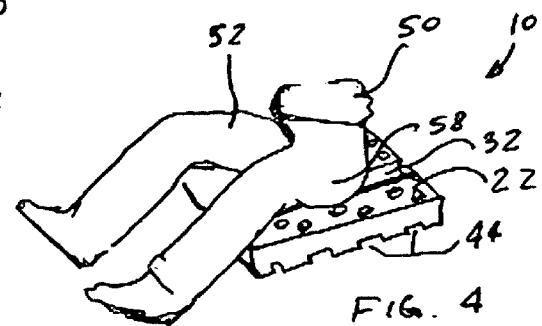
FIG. 4 is a partial perspective view of the present invention in use with a person sitting thereon.

In particular reference to FIG. 1, there is a means, generally designated 30, formed in the first surface 22 for ergonomic engagement with at least one portion of a human body 50 (FIGS. 3 and 4. Such ergonomic means 30 of the presently preferred embodiment includes a pair of longitudinal cavities 32 each shaped to engage at least one of thigh 52, knee 54 and calf 56. Alternatively or additionally to the pair of longitudinal cavities 32, the ergonomic means 30 may include a centrally disposed cavity 34 shaped for engaging buttocks 58 of such human body 50.

Furthermore, the device 10 may further include air ventilation means 40 formed in the first surface 22 having the ergonomic means 30. Preferably, such air ventilation means 40 is a predetermined plurality of raised projections 40 disposed in a predetermined pattern.

Figure 2:
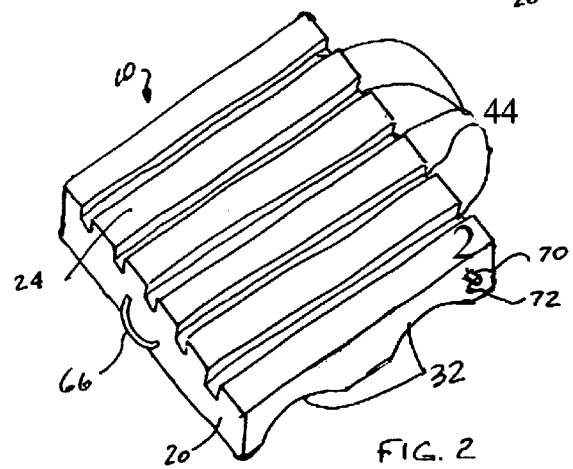
FIG. 2 is a perspective view of the cushioning and support device of the embodiment of the invention shown in FIG. 1, particularly illustrating the structure of an opposed second surface.
Figure 5:
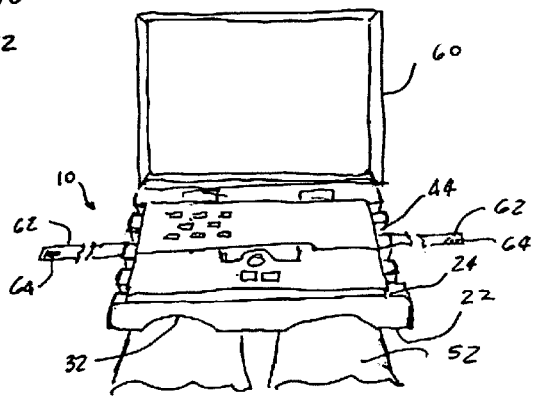
FIG. 5 is a partial perspective view of the present invention in use with a notebook computer.

Now in reference to FIGS. 2 and 5, there is means 44 formed in the second surface 24 for providing air ventilation under a load 60, such an electronic device, in particular a notebook computer, placed onto the second surface 24.

In the presently preferred embodiment of the invention, such air ventilating means 44 is a predetermined plurality of parallel longitudinal grooves 44 disposed on surface 24 and having a predetermined cross-section. Alternatively, such air ventilating means 44 may be a predetermined plurality of upwardly raised projections 40 disposed in a predetermined pattern.

As discussed supra, the HR-PU foam inherently provides anti-slip capabilities of the device 10. When such device 10 is manufactured from alternative materials, for example a rigid plastic material, the anti-slip capability of the device 10 may be provided by a plurality of upwardly raised projections 40 formed from any well known materials having such anti-slip capabilities and attached to at least one of the first surface 22 and second surface 24.

In operation, the first surface 22 and particularly, cavities 32 are used for cushioning at least one of thigh 52, knee 54 and calf 56, as best shown in FIG. 3. It will be appreciated that such cavities 32, shaped to enable a larger contact area with such at least one of knee 54 and calf 56 than presently available cushioning devices having a flat surface, will provide improved comfort for a kneeling person. The centrally disposed cavity 34 is used for cushioning buttocks 58 of a person sitting on such device 10, as best shown in FIG. 4.

The second surface 24 is useable for supporting a load or as a desk surface. In a particular reference to FIG. 5, the device 10 is shown in use for supporting an electronic device 60 such as a notebook computer. A pair of strap 62 may be provided for securing such notebook computer 60 with fasteners 64 such as a hook and loop type fastener. The longitudinal grooves 44 are advantageously provided for dissipating heat generated by the notebook computer 60 in at least one direction. The longitudinal cavities 32 are formed in a direction perpendicular to the direction of the longitudinal groves 44 to dissipate generated heat in a direction away from the human body 50. Advantageously, the cavities 32 are shaped to engage a portion of each thigh 52 providing improved cushioned support during use of such notebook computer 60. Furthermore, the upwardly raised projections 40 form a gap between the first surface 22 and each thigh 52 enabling air circulation therebetween.

The device 10 may be further provided with a carrying handle 66, or straps 62 may be used for carrying the device 10.

Although the present invention has been shown in terms of the unitary body device 10 formed from a single material, it will be apparent to those skilled in the art, that the present invention may be applied to the device 10 manufactured from at least two different materials and rigidly, or removably, attached therebetween. For example, a first surface 22 may be formed from HR-PU foam and a second surface 22 may be formed from a smooth rigid material such as thermoplastic for use as a portable desk.

Furthermore, the first surface 22 and the second surface 24 may be manufactured from the same material but have different colors.

As it has been disclosed supra, the device 10 of the presently preferred embodiment is molded from HR-PU foam. Alternatively, such device 10 may be manufactured from an inflatable plastic material, such as polyvinyl chloride, and inflated to form at least the first surface 22 and second surface 24. To enable inflation and deflation, the device 10 is provided with an air valve 70 which may be of a self-sealing type or which may be adapted with a plug 72. It will be appreciated that such device 10, when deflated, is advantageous for convenient storage in a purse, briefcase and the like. Additionally, a fabric cover (not shown) may be attached to at least a portion of the device 10 manufactured from such polyvinyl chloride material.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A cushioning and support device comprising:
   (a) a member having each of a predetermined size, a predetermined shape and predetermined material, a first surface and an opposed second surface;
   (b) a pair of cavities formed in said first surface for ergonomic engagement with and cushioning of at least one portion of a human body; and
   (c) a plurality of longitudinal grooves formed in said second surface for providing air ventilation under a load placed onto said second surface.

2. The device, according to claim 1, wherein said predetermined material is a flexible foam and said unitary member is molded.

3. The device, according to claim 2, wherein said flexible foam is a HR-PU foam.

4. The device, according to claim 1, wherein said predetermined material is a polyvinyl chloride and said unitary member is inflated to form said first surface, said second surface and said ergonomic means.

5. The device, according to claim 1, wherein each of said pair of cavities is shaped to engage at least one of a thigh, knee and calf.

6. The device, according to claim 1, wherein said further includes a cavity disposed within said first surface, said cavity being shaped for engaging buttocks of such human body.

7. The device, according to claim 1, wherein said device further includes an anti-slip means engageable with at least one of said first and second surface.

8. The device, according to claim 7, wherein said anti-slip means is formed by material properties of said device.

9. The device, according to claim 1, wherein said device further includes one of a carrying strap, handle and combination thereof being attached to said member.

10. The device, according to claim 1, wherein said device further includes at least a pair of straps for securing such load placed onto said first surface.

11. The device, according to claim 1, wherein such load is an electronic device and wherein said plurality of longitudinal grooves are disposed in a direction perpendicular to a direction of said pair of cavities for dissipating heat generated by such electronic device in a direction away from such human body when said pair of cavities engage thigh portion of such human body.

12. The device, according to claim 1, wherein said device includes a predetermined plurality of upwardly raised projections formed in at least said first surface and disposed in a predetermined pattern.

13. A method of cushioning at least one portion of a human body during one of kneeling and sitting, said method comprising the steps of:
 (a) providing a member having each of a predetermined size, a predetermined shape, a predetermined material, a first surface and an opposed second surface;
 (b) forming a pair of first cavities in said first surface each shaped for ergonomic engagement with and cushioning of at least one of a thigh, knee and calf;
 (c) forming a second cavity in said first surface which is shaped for engaging buttocks of said human body;
 (d) positioning said member with said first surface being oriented toward said human body; and
 (e) engaging, with said human body, one of said pair of first cavities and said second cavity.

14. The method, according to claim 13, wherein said method includes the additional step of forming a plurality of longitudinal grooves in said second surface for supporting an electronic device being placed onto said second surface and for dissipating heat generated by said electronic device.

* * * * *